United States Patent [19]

Rooney et al.

[11] Patent Number: 4,492,992
[45] Date of Patent: Jan. 8, 1985

[54] HIGH STORAGE DENSITY DISC DATA STORE EMPLOYING CONTROLLED-ANGULAR-VELOCITY ROTARY MEDIUM

[76] Inventors: John O. Rooney, 29, Drum Close, Stenton, Glenrothes, Fife, Scotland; Ian B. Freeman, 2242, Ptarmigan Ct., Union City, Calif. 98457

[21] Appl. No.: 391,804

[22] Filed: Jun. 24, 1982

Related U.S. Application Data

[63] Continuation-in-part of Ser. No. 138,469, Apr. 8, 1980, abandoned.

[30] Foreign Application Priority Data

Apr. 17, 1979 [GB] United Kingdom ............... 7913220

[51] Int. Cl.³ ...................... G11B 5/55; G11B 19/24
[52] U.S. Cl. ........................................ 360/73; 360/78
[58] Field of Search ............... 318/39; 358/127, 128.6; 360/75, 78, 86, 107, 73

[56] References Cited

U.S. PATENT DOCUMENTS

| | | | |
|---|---|---|---|
| 3,646,259 | 2/1972 | Schuller | 360/86 X |
| 3,826,965 | 7/1974 | Bringol | 318/39 |
| 3,939,302 | 2/1976 | Kihara | 358/127 X |
| 4,079,942 | 3/1978 | Kunen | 369/266 |
| 4,190,860 | 2/1980 | Somers et al. | 358/128.5 |

FOREIGN PATENT DOCUMENTS

| | | |
|---|---|---|
| 0011493 | 5/1980 | European Pat. Off. |
| 52-17183 | 8/1977 | Japan ............... 360/73 |
| 53-120411 | 10/1978 | Japan ............... 360/73 |
| 55-87348 | 7/1980 | Japan ............... 360/73 |
| 56-22255 | 3/1981 | Japan ............... 360/73 |
| 56-114176 | 9/1981 | Japan ............... 360/73 |
| 1266021 | 3/1972 | United Kingdom . |
| 1400958 | 7/1975 | United Kingdom . |
| 1550915 | 8/1979 | United Kingdom . |

OTHER PUBLICATIONS

Abstract EP 80 30 1119 Re Magnetic Memory System, K. Kimoto Kokai, No. 53-69015, 6-20-78.

Primary Examiner—George G. Stellar

[57] ABSTRACT

In a disc data store for the storage of retrievable informational data in a plurality of concentric circular data storage tracks on a rotary medium accessed by a positioner operable to respond to a track command signal to place a data recording or recovering transducer into adjacence with a selected track where a disc rotator is operable to maintain the surface velocity of the medium beneath the transducer substantially constant regardless of the radius of the transducer on the medium for the purpose of maximizing the data storage capacity of the medium, the sluggishness of response of the angular velocity of the medium found in those systems where a position transducer senses the position of the recording or recovering transducer to provide an output for controlling the angular velocity of the medium is overcome by providing that the medium is rotated by an angular velocity control servomechanism operable to respond to the same track command signal as received by the positioner to so maintain the surface velocity of the medium relative to the recording or recovering transducer and capable of stabilizing the angular velocity in advance of the recording or recovering transducer arriving at a target track.

22 Claims, 7 Drawing Figures

HIGH STORAGE DENSITY DISC DATA STORE EMPLOYING CONTROLLED-ANGULAR-VELOCITY ROTARY MEDIUM

This application is a continuation-in-part application claiming priority from co-pending application Ser. No. 138,469 filed Apr. 8, 1980, now abandoned.

BACKGROUND TO THE INVENTION

1. Field of the Invention

The present invention relates to disc drives for storing retrievable informational data on a rotary medium where, in response to a common data track demand signal both a transducer is positionable to interact with selectable radii on the medium and the angular velocity of the medium is controllable to maintain the surface velocity of the medium relative to the transducer substantially constant regardlessly of the radius of the transducer on the medium.

2. The Prior Art

It is well known to record informational data in a plurality of concentric, circular data storage tracks on a rotating disc, where the disc rotates with a constant angular velocity and where the tracks are accessed by the placing in adjacence thereto of a reading or writing head.

The head has a lower limit of resolution. If two consecutive recorded features are less than a predetermined distance apart the head cannot properly distinguish between them. If the amount of data on the disc is to be maximised the data on all tracks must approach as nearly as possible to maximum density where the limit of resolution is achieved. Data is generally recorded in response to the regulation of a fixed-frequency crystal oscillator clock. The angular velocity of the medium being constant, the surface velocity of the medium beneath the head is least at the least recording radius on the disc and the density of stored binary digits is greatest for the smallest-radius track. The number of bits on the other tracks is constrained to be the same for each of them as for the least radius track. If the innermost track is at maximum data density, the others are not since they are longer and the storage capacity of the disc is under-utilised.

In order to overcome this difficulty a first style of solution was adopted where the data were recorded and recovered from the surface of the disc at different frequencies dependently upon the radius of the track whereon they were recorded. This was known as "zoning" and had the considerable disadvantage that large amounts of additional clock and decoding hardware were required in order for the system to operate. In those systems where the ratio of the maximum to minimum recording radii on the medium was small the percentage gain in data capacity was not worth the expense of attainment and in those systems where the ratio was large the additional cost of the numerous additional components rendered the method unattractive despite the potentially large storage capacity improvement.

Another style of solution is exemplified by U.S. Pat. No. 3,826,965 granted July 30, 1974 for an invention by Charles Brignol. Brignol discloses a system where the surface velocity of a disc beneath a transducer is maintained substantially constant by a linear potentiometer affixed so that its wiper is co-movable with the head. The two ends of the potentiometer and the wiper are taken as input to a hyperbolic function generator which generates output inversely proportional to the radius of the head over the disc. The output of the function generator is used to control the speed of the motor which turns the disc so that the angular velocity of the disc is inversely proportional to the radius of the head. This disclosure can be taken as representative of all methods where a transducer senses the radius of the head and the output of the transducer is coupled to control the angular velocity of the disc. All such methods have the considerable disadvantage that the speed-controlling demand signal to whatever system is controlling the angular velocity of the disc must wait to change as the radius of the head changes. The demand signal must always change in sympathy with the position of the head and in consequence the control mechanism for the disc angular velocity must lag behind the position of the head. Thus, if the head is sent from an outer to an inner track, the head will arrive at its destination radius before the speed of the disc has stabilised at its new value, since the disc angular velocity control system did not know the final value of demand signal until the head actually arrived. It is important in disc drives that data decoding can begin as soon as possible after the arrival of the head over its destination track. Correct data decoding requires that the angular velocity of the disc be substantially correct and having to wait for the disc speed to stabilise is not desirable.

SUMMARY OF THE INVENTION

The present invention provides a disc drive wherein both the radius of interaction of a recording or signal recovering transducer with a rotary medium and the angular velocity of the medium are controllable in response to the same control signal such that the surface velocity of the medium relative to the transducer is maintained constant for all radii of its interaction with the medium, where the manner of control provides the possibility of the angular velocity of the medium being stable at its required value in advance of the transducer arriving at its required radius on the medium. The invention further provides that the common control signal is of a type already commonly used to control the radius of interaction of the transducer with the medium.

In a first preferred embodiment a disc drive is provided for the storage of informational data in a plurality of concentric data storage tracks on a rotatable magnetic disc where a magnetic read/write head is positionable over a selectable one of the tracks in response to a track demand signal by means of a positioning system.

The track demand signal is preferably of the type used to control the radius of the heads in the Burroughs B9489 and B9480 and B9481 disc drives and specified in Burroughs specifications numbers 2156-7011 and 1878-9362, where the concentric data storage tracks are consecutively numbered with the track of greatest radius being numbered zero and the track of least radius having the highest number, and the track demand signal comprises a binary number indicative of which one of the tracks the head is required to access.

The track demand signal is preferably communicated to the disc drive via a demand bus comprising a plurality of ordered lines, one for each of the binary digits of the track-indicating binary number. The demand bus preferably comprises a first signal line for indicating to the disc drive that the head should be sent to the indicated track and a second signal line for indication to be provided by the disc drive that the head has arrived at its track.

The positioning system preferably comprises a stepping motor positioner driving a lead screw to move the head along a radial path over the disc. The positioning system preferably comprises a stepping motor control system wherein a bidirectional counter is resettable by means of an optical flag breaking a beam of light when the head is in the track zero position over the track of greatest radius. The stepping motor control system preferably comprises a register for storing the binary track number on the ordered lines in response to the receipt of the signal on the first signal line, a positioner clock signal source, and a numerical comparator operable to indicate whether the count of the counter is less than, equal to or greater than the number stored in the register. The outputs of the comparator are coupled as inputs to the counter such that the counter counts up in sympathy with the clock when the count is less than the number in the register, counts down in sympathy with the clock when the count is more than the number stored in the register, and does not count at all when the count and the number in the register are equal. The output of the counter is preferably decoded and coupled to a stepping motor driver such that the stepping motor advances the head by one track pitch towards the centre of the disc for each "up" count of the counter and withdraws the head toward the periphery of the disc for each "down" count of the counter. The output of the numerical comparator indicative of the number in the register being equal to the count is preferably coupled onto the second signal line as the signal indicative of the head having arrived at its required track.

The disc drive preferably comprises a a disc rotating servomechanism operable to control the angular velocity of the disc. The disc rotating servomechanism preferably responds to an analog speed demand signal to control the speed of rotation of the disc in linear sympathy therewith. The disc rotating servomechanism also preferably comprises a digital-to-analog convertor coupled to receive the number stored in the register of the positioning system and operable to give an output linearly representative of the magnitude of the binary number of the required track with which the head is required to interact. The output of the convertor is preferably coupled as a first additive input to a summing junction. A fixed reference signal is preferably coupled as a second additive input to the summing junction. The summing junction preferably provides an analog output representative of the sum of its inputs. The output of the summing junction is preferably coupled as the analog speed demand signal.

The fixed reference is preferably of a magnitude to cause the disc to be rotated with the desired surface velocity relative to the head when the head is at the track of greatest radius and the output of the digital-to-analog is preferably scaled such that the sum of its maximum output and of the fixed reference causes the disc to be rotated with the desired surface speed relative to the head when the head is over the track of least radius.

In a second preferred embodiment the numbering of the data storage tracks and the method of providing track positioning commands is preferably the same as in the first preferred embodiment. In the second preferred embodiment there is preferably provided a register for storing the binary number indicative of the number of the track to which it is desired to send the head in response to the presence of an indication on the first signal line.

The positioning system responds to the track positioning commands as does the positioning system in the first preferred embodiment to move the head over the desired track. In the second preferred embodiment the positioning system preferably comprises a linear servomechanism driving a voicecoil actuator operable to move the head along a radial path over the disc. Coarse position feedback is preferably provided by means of a linear potentiometer disposed along the path of movement of the head with its wiper connected to the head to provide output linearly representative of the radius of the head on the disc. Fine position feedback is preferably provided by means of an optical shutter providing four spaced repetitive feedback signals at relative 90° spacings to one another. The repetitive signals when coupled as the feedback signal each preferably provide a spaced plurality of rest positions with the head over a data track, each of the rest positions being four tracks away from the others on either side. The four signals preferably provide interlaced sets of rest positions so that all tracks can be reached. The servomechanism preferably comprises a digital to analog convertor operable to provide output linearly proportional to the magnitude of the binary number stored in the register. The servomechanism is preferably operable in a first coarse mode to position the head approximately over its desired track by matching the output of the linear potentiometer against the output of the digital-to-analog convertor. The servomechanism is preferably operable thereafter to operate in a fine mode by responding to the two least significant binary digits of the number in the register to select one of the four repetetive feedback signals to position the head precisely over the correct track.

In the second preferred embodiment the disc rotating servomechanism preferably comprises a Read-Only-Memory (ROM) in receipt of the number stored in the register and operable to use that number as an address. The ROM preferably stores binary numbers indicative of the required angular velocity of the disc with the head on each track so that the surface velocity of the disc beneath the head is the same for every track. The output of the ROM is preferably a plural parallel binary digit number coupled as input to a motor speed control digital-to-analog convertor whose output is linearly representative of the binary number on its input. The output of the motor speed control digital-to-analog convertor is preferably coupled as the rotational speed controlling demand signal to a rotation servomechanism controlling the angular velocity of the disc.

BRIEF DESCRIPTION OF THE DRAWINGS

The invention is further described, by way of an example, by the following description in conjunction with the appended drawings, in which.

DETAILED DESCRIPTION OF THE PREFERRED EMBODIMENTS

Figure 1:
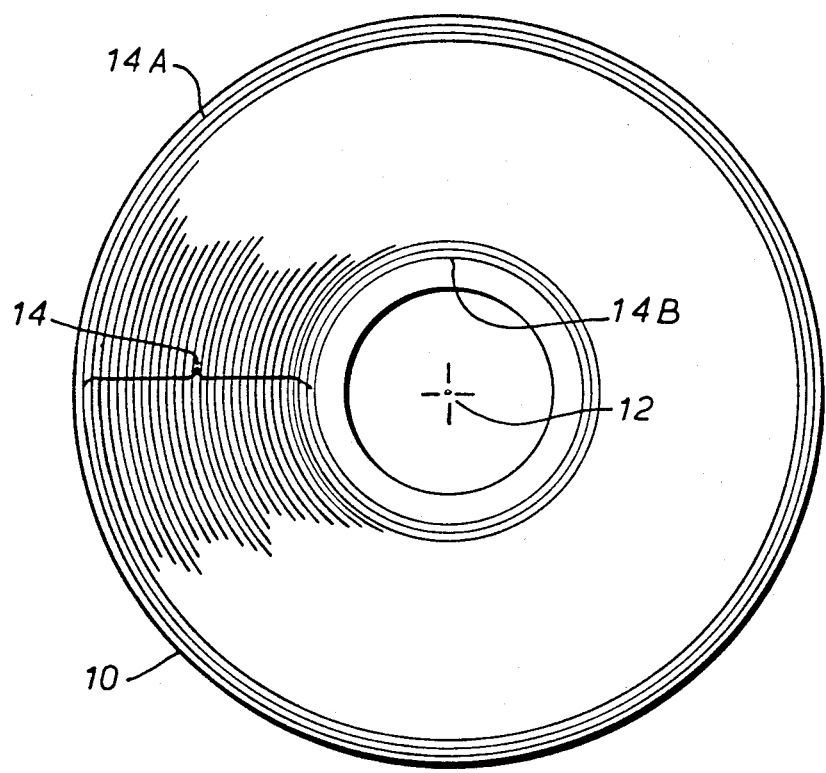
FIG. 1 shows the disposition of data storage tracks on a disc.

FIG. 1 shows a data storage disc for rotation about a centre 12 for the storage of retrievable informational data in a plurality of concentric circular data storage tracks 14 on its surface. The disc 10 is magnetic though it is to be realised that the present invention is applicable to data storage systems employing other than a magnetic medium. The tracks 14 are accessed by placing a magnetic read/write head in adjacense to the track 14 whereat it is desired to record or recover data.

The tracks are consecutively numbered starting with zero at the track of greatest radius 14A and increasing by unit increment such that the track of least radius 14B bears the highest number. In the example chosen, there are 256 tracks, though it is to be understood that any number of tracks can be accomodated by the use of modifications that will be apparent. The tracks are numbered in binary. Thus the track of greatest radius 14A has the number 00000000, the next track 14 adjacent to it towards the centre 12 has the number 00000001, and so on until the innermost track which has the terminal number 11111111. The tracks 14 are radially equispaced across the surface of the disc 10 so that an increment in the track number by one means a movement towards the centre of the disc by one track pitch and a decrement in the track number by one means a movement away from the centre 12 by one track pitch.

Figure 2:
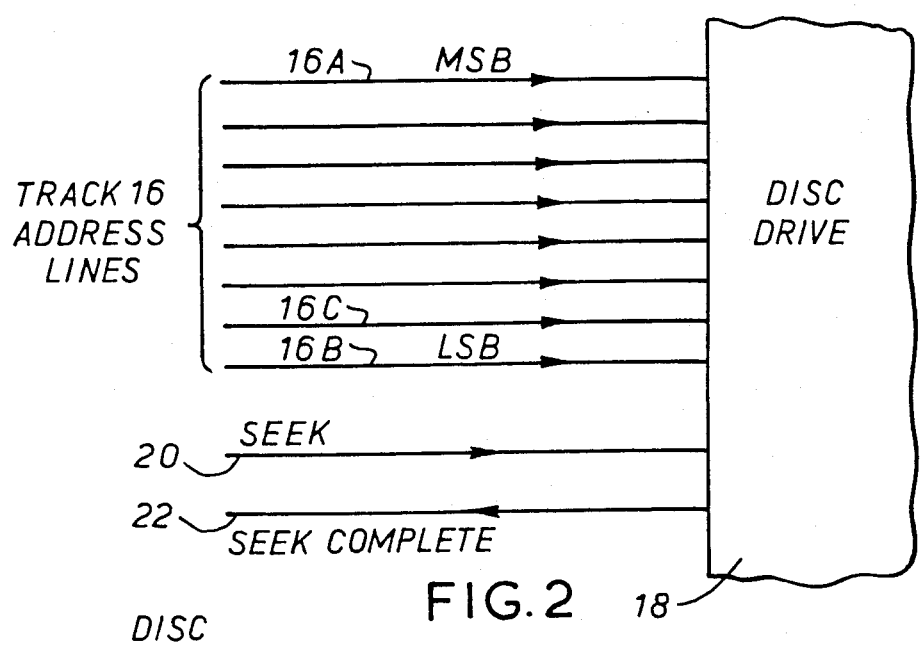
FIG. 2 shows the manner of interface for controlling the disc drive.

FIG. 2 shows the interface connection for joining a disc drive to a controlling host. It is the same interface as is used in the B-9480, B-9481 and B-9489 disc drives made by the Burroughs corporation and specified in their documents numbered 2156-7011 and 1878-9362.

An ordered plurality of parallel track address lines 16 are provided each with a logic signal to represent the binary number indicative of the number of the track 14 to which the head should be sent to interact, one of the lines 16A providing the most significant binary digit MSB of that number, another 16B the least significant binary digit (LSB), another 16C the second least significant binary digit, and so on, there being eight track address lines 16 in all so that each of the 256 tracks 14 can be addressed. If the number of tracks were between 64 and 128 only 7 address lines 16 would be required, and in the event of the number of tracks lying between 256 and 512 an additional track address line 16 would be required. It can therefore be seen that by varying the number of track address lines 16 different total numbers of tracks 14 can be accomodated.

The track address lines 16 carry the track address to the disc drive 18 from any external controlling host system. The host system provides a "SEEK" signal on the first signalling line 20, here after called the seek line 20, which is a logic pulse indicative of a command that the head in the disc drive 18 should be sent to the track 14 whose binary number is currently indicated on the track address lines 16. The disc drive 18 provides a "SEEK COMPLETE" signal on the second signalling line 22, here after called the seek complete line 22 which is a logic signal indicative to the host system of the head actually having arrived at the track 14 whose number was provided on the track address lines 16 at the time of ocurrence of the pulse on the seek line 20.

Figure 3:
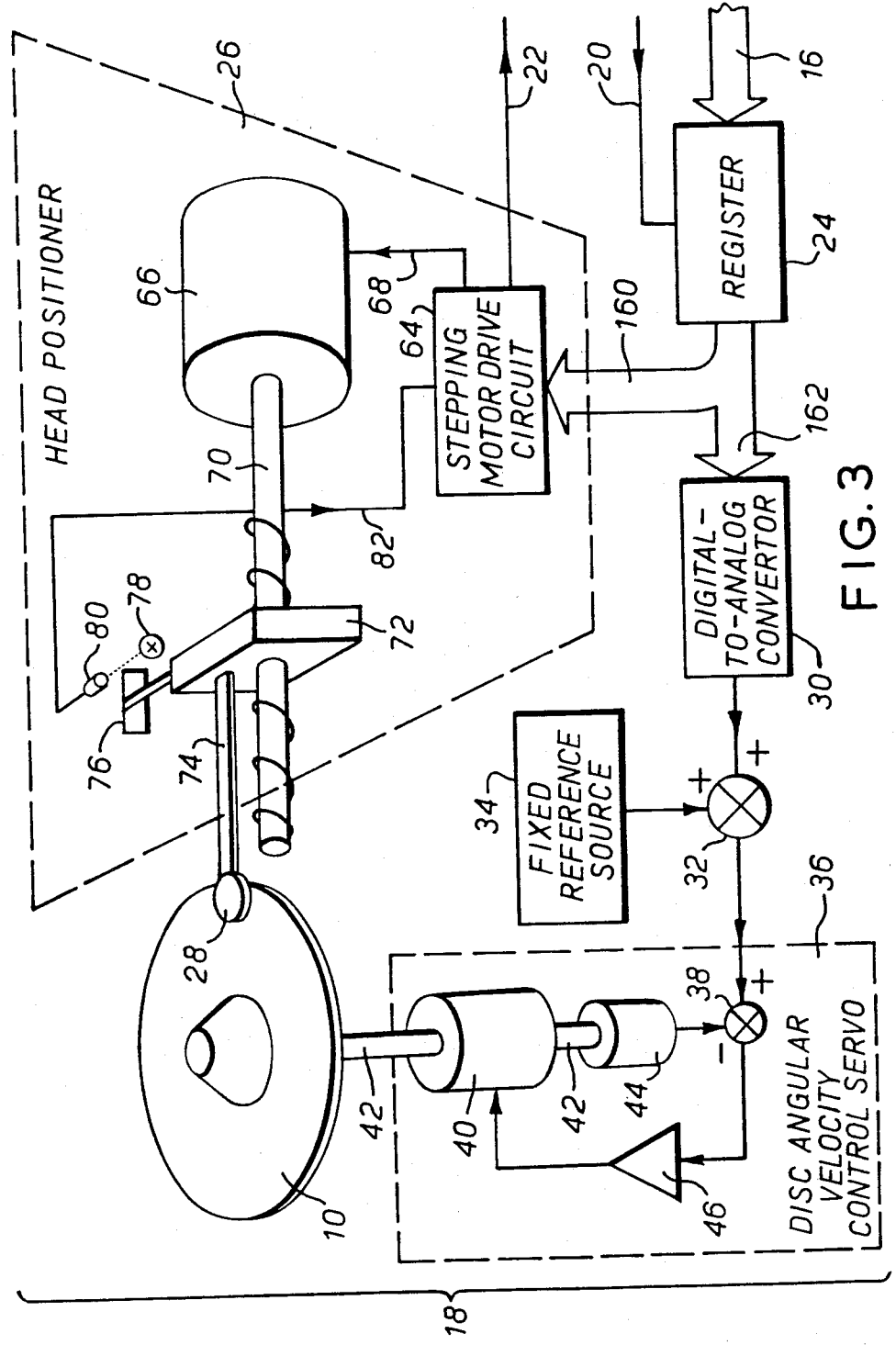
FIG. 3 shows the first preferred embodiment of the invention.

FIG. 3 shows schematic detail of the first preferred embodiment of the invention.

A register 24 receives the seek line 20 and the track address lines 16 and is operable in response to the receipt of the pulse on the seek line 20 to store the binary number on the address lines 16. The register 24 provides its stored number as a parallel binary digit output.

The output of the register 24 is provided firstly as a track command signal to a head positioner 26 via a track command bus 160. The head positioner 26 in this embodiment is, for reason of example, a stepping motor device similar to that employed in the Burroughs B-9489 disc drive and serves to move a magnetic read/write head over the desired track 14 in a manner to be described below.

The output of the register is provided secondly as a disc rotational speed command signal on the disc speed bus 162 coupled as the input to a rotational speed demand digital-to-analog convertor 30. The digital-to-analog convertor 30 provides an analog output signal linearly proportional to the magnitude of the binary number presented on the track address lines 16 and stored in the register 24.

The output of the digital-to-analog convertor 30 is coupled as a first additive input to a speed demand signal summing junction 32. A fixed reference source 34 provides a reference level as a second additive input to the speed demand signal summing junction 32. The speed demand signal summing junction 32 provides an output representative of the sum of the output of the digital-to-analog convertor 30 and of the reference source 34 coupled as the speed demand signal to the disc angular velocity control servomechanism 36. The angular velocity control servomechanism 36 responds to the angular velocity demand signal from the speed demand summing junction 32 to rotate the disc 10 with an angular velocity in linear proportion thereto.

As an example of the manner in which the angular velocity control servomechanism 36 can be implemented, the speed demand signal from the speed demand summing junction 32 is coupled as the additive input to an angular velocity servo summing junction 38. An electric motor 40 rotates a shaft 42 coupled to rotate the disc 10. The shaft 42 is also coupled to rotate a tachometer 44 providing an output linearly proportional to the angular velocity of the shaft 42. The output of the tachometer 44 is coupled as a subtractive input to the angular velocity servo summing junction 38 whose output is representative of the difference between the speed demand signal from the speed demand summing junction 32 and the output of the tachometer 44. The output of the angular velocity servo summing junction 38 is coupled as the input to a power amplifier 46 whose output is coupled to power the electric motor 40. It is to be appreciated that there are many other ways of implementing the disc angular velocity control servomechanism 36 all equally useful within the embodiment of the invention. For example, the electric motor can be of various different kinds, with or without brushes and driven either by a voltage source or a source of variable frequency. The tachometer can be embodied in many different ways which will be apparent to those skilled in the art.

Figure 4:
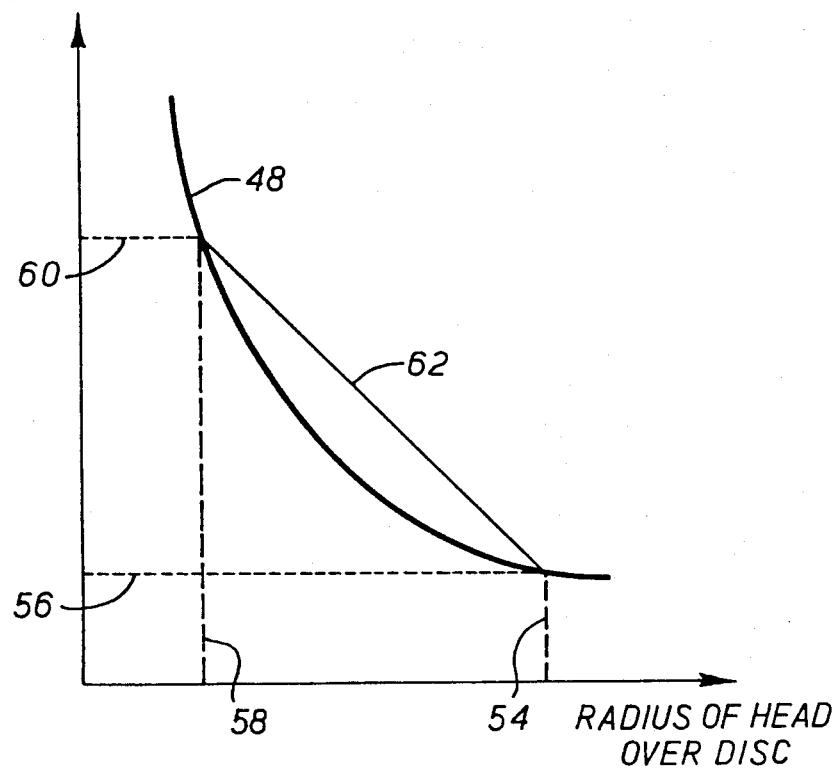
FIG. 4 shows a graph of disc angular velocity versus radius of head on the disc.

FIG. 4 shows a graph of disc angular velocity versus radius of the head 28 over the disc 10. An hyperbolic curve 48 represents the ideal desired relationship therebetween, the curve 48 representing the relationship;

If the disc angular velocity is $\omega$ radians/second

If the radius of the head 28 on the disc 10 is R
If the desired surface velocity of the disc 10 beneath the head 28 is V, then $$R\omega = V.$$

Rearranging the expression produces the relationship;

$$\omega = (V/R)$$

Thus, in the ideal case, the angular velocity of the disc 10 should be inversely proportional to the radius of the head 28 on the disc 10.

When the head 28 is over the outermost track 14A it occupies a maximum radius 54 whereat a minimum angular velocity 56 is ideally required. At the outermost track 14A, where the binary number on the address lines 16 is zero, there is no contribution to the angular velocity demand signal coming from the digital-to-analog convertor 30 since it is in receipt of the input 00000000. Thus the entire demand input to the angular velocity control servomechanism 36 comes from the reference source 34. The reference source 34 is therefore adjusted to provide a fixed output which alone is capable of causing the angular velocity control servomechanism 36 to rotate the disc 10 with the minimum angular velocity 56.

When the head 28 is over the innermost track 14B it occupies a minimum radius 58 whereat a maximum disc angular velocity 60 is required. At the innermost track 14B the speed demand digital-to-analog convertor 30 is in receipt of the binary number 11111111, its maximum output. The angular velocity demand signal provided to the angular velocity control servomechanism 36 is therefore proportional to the sum of the output of the fixed reference source 34 and of the output of the digital-to-analog convertor 30. The scaling of the output of the digital-to-analog convertor 30 is therefore chosen such that the disc 10 is caused to rotate with the maximum angular velocity 60 when the digital-to-analog convertor 30 is in receipt of the highest track address 11111111.

For all tracks 14 intermediate between the innermost track 14B and the outermost track 14A the digital-to-analog convertor 30 provides an output linearly proportional to their track addresses which is linearly proportional to their radii. Thus, instead of the disc angular velocity being related to the radius of the head 28 on the disc 10 through the ideal curve 48, the actual angular velocity is related to the head 28 radius through the straight line approximation 62.

Attention is returned to the head positioner 26 of FIG. 3. The head positioner 26 comprises a stepping motor drive circuit 64 in receipt of the track command bus 160 and operable to drive a stepping motor 66 via a motor drive coupling 68. The drive circuit 64 also provides the "SEEK COMPLETE" on the seek complete line 22.

The stepping motor 66 rotates a lead screw 70. In rotating, the lead screw 70 moves a head mounting block 72 threaded thereon along a path radial to the disc 10. The head 28 is affixed to the head mounting block 72 via a spring flexure 74.

An optical flag 76 is affixed to move with the head mounting block 72 and positioned such that it just interrupts the passage of light between a light source 78 and a phototransistor 80 when the head 28 is over the outermost track 14A, bearing the number 00000000. The output of the phototransistor 80 is coupled via the reset coupling 82 to the stepping motor drive circuit 64.

Figure 5:
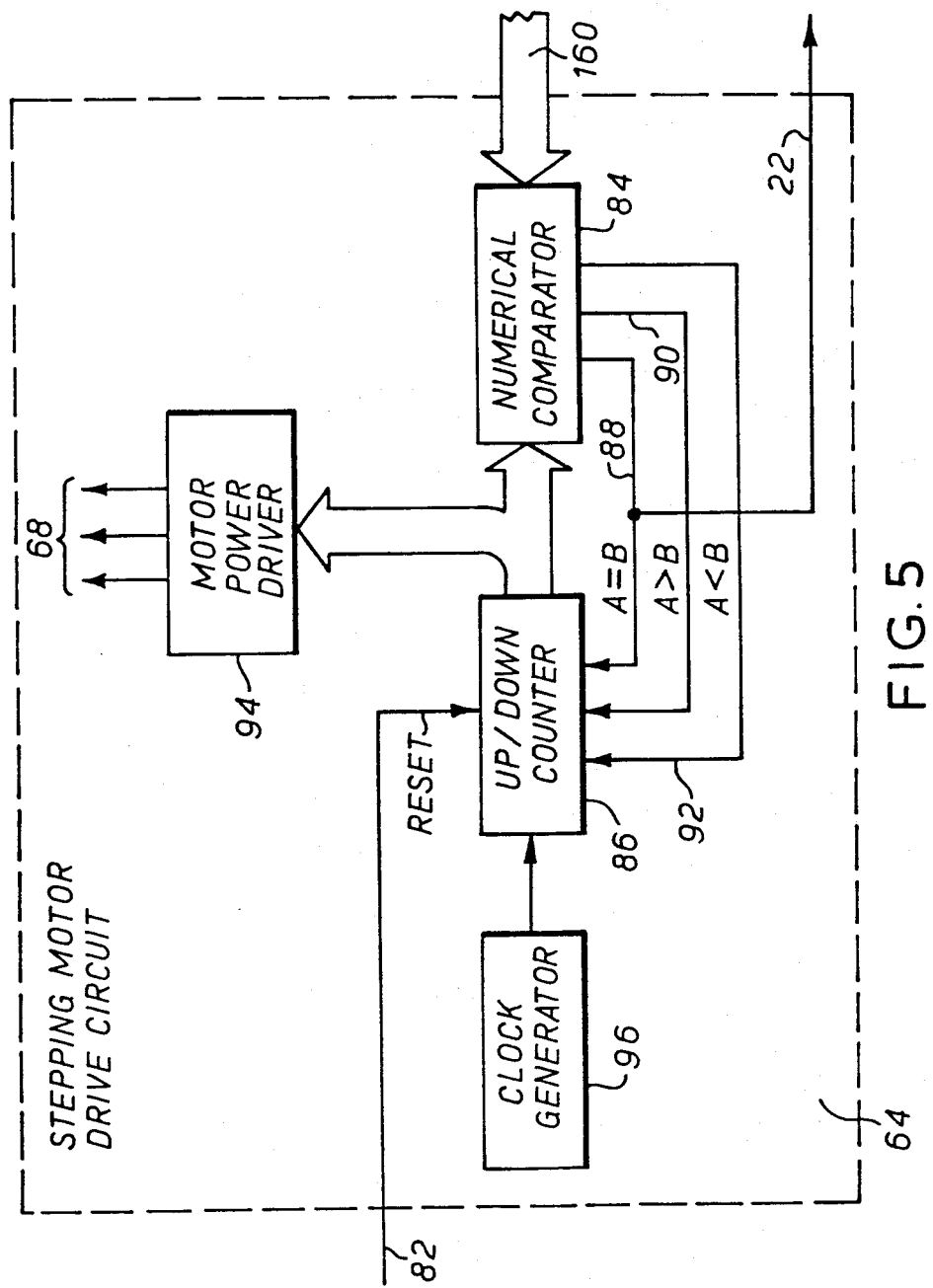
FIG. 5 shows schematic detail of the stepping motor drive circuit of FIG. 3.

Attention is drawn to FIG. 5 which shows schematic detail of the stepping motor drive circuit 64 of FIG. 3.

A numerical comparator 84 is in receipt of the track command bus 160 and of the current count of a bi-directional counter 86 and is operable to provide indication on a first line 88 when the two counts are equal, on a second line 90 when the count of the counter 86 is greater than the binary number on the track command bus 160, and on a third line 92 when the count of the counter 86 is less than the binary number on the track command bus 160.

The first second and third lines 88 90 92 are coupled to and control the counter 86 such that when indication is provided on the first line 88 the counter 86 is inhibited from counting, when indication is provided on the second line 90 the counter 86 is forced to count by unit decrement in a downwards direction and when the indication is provided on the third line 92 the counter 86 is forced to count by unit increment in an upward direction, it being appreciated that indication can only be provided on one of the lines 88 90 92 at any one time.

The count of the counter 86 is coupled as input to a motor power driver 94 which decodes the count to step the motor 66 via the motor drive coupling 68 in a manner very well known in the art. It is here indicated that the stepping motor 66 has three phase windings. It is to be appreciated that any number of phases greater than two can be used.

The reset coupling 82 is coupled to the counter 86 as a reset input such that, when the head 28 is over the outermost track 14A bearing the number 00000000 the output of the counter 86 is forcibly reset to 00000000. Each count of the counter 86 moves the head 28 by the distance between any two tracks 14. Thus, by the action of the phototransistor 80 the count of the counter 86 is forced to be equal to the number of the track 14 over which the head 28 is actually situated at any time. Counting is accomplished in sympathy with the output of a clock generator 96.

To illustrate the operation of the disc drive 18 in response to an alteration of the address on the address lines 16 imagine that the head 28 is correctly positioned over a desired track 14 and that the angular velocity of the disc is stable. The host system puts a new track number on the track address lines 16 and puts a seek pulse on the seek line 20. The register 24 in response to the seek pulse latches the new track address and sends it both to the disc angular velocity control servomechanism 36 via the digital-to-analog convertor 30 and to the head positioner 26. Both systems begin moving towards their respective targets at the same time. In the head positioner 26 the signal on the first line 88 ceases to indicate equality and the counter 86 is enabled to count up or down as appropriate the head 28 moving toward its target track by one track width for each count. When the count equals the new track number the first line 88 once again provides its indication and the count is frozen by the inhibition of the counter 86 thus stopping the head 28 over the target track. At the same time the angular velocity demand signal to the disc angular velocity demand servomechanism 36 alters and the angular velocity of the disc 10 starts to move independently towards the rate which will be required at the new track. If the bandwidth of the disc angular velocity control servomechanism 36 is made sufficiently large, the angular velocity of the disc reaches its target value before the head 28 arrives over its target track 14, and the disc drive 18 is capable of commencing reading or writing operations on the disc 10 as soon as the head 28 arrives over its new track 14.

The equality of count indication on the first line 88 is coupled back to the host system as indication that the head 28 has arrived over its target track 14, thereby providing the "SEEK COMPLETE" signal.

It is to be appreciated that the details of the construction and operation of the head positioner 26 of the first preferred embodiment are not restrictive, merely being indicative of one manner in which the invention can be embodied, and provided for the purpose of clarification of the description of the mutually independent operation towards a mutually co-operative result of the head positioner 26 and of the disc angular velocity control servomechanism 36 and to illustrate in clear detail how the same track address signal can be used to control both functions.

Figure 6:
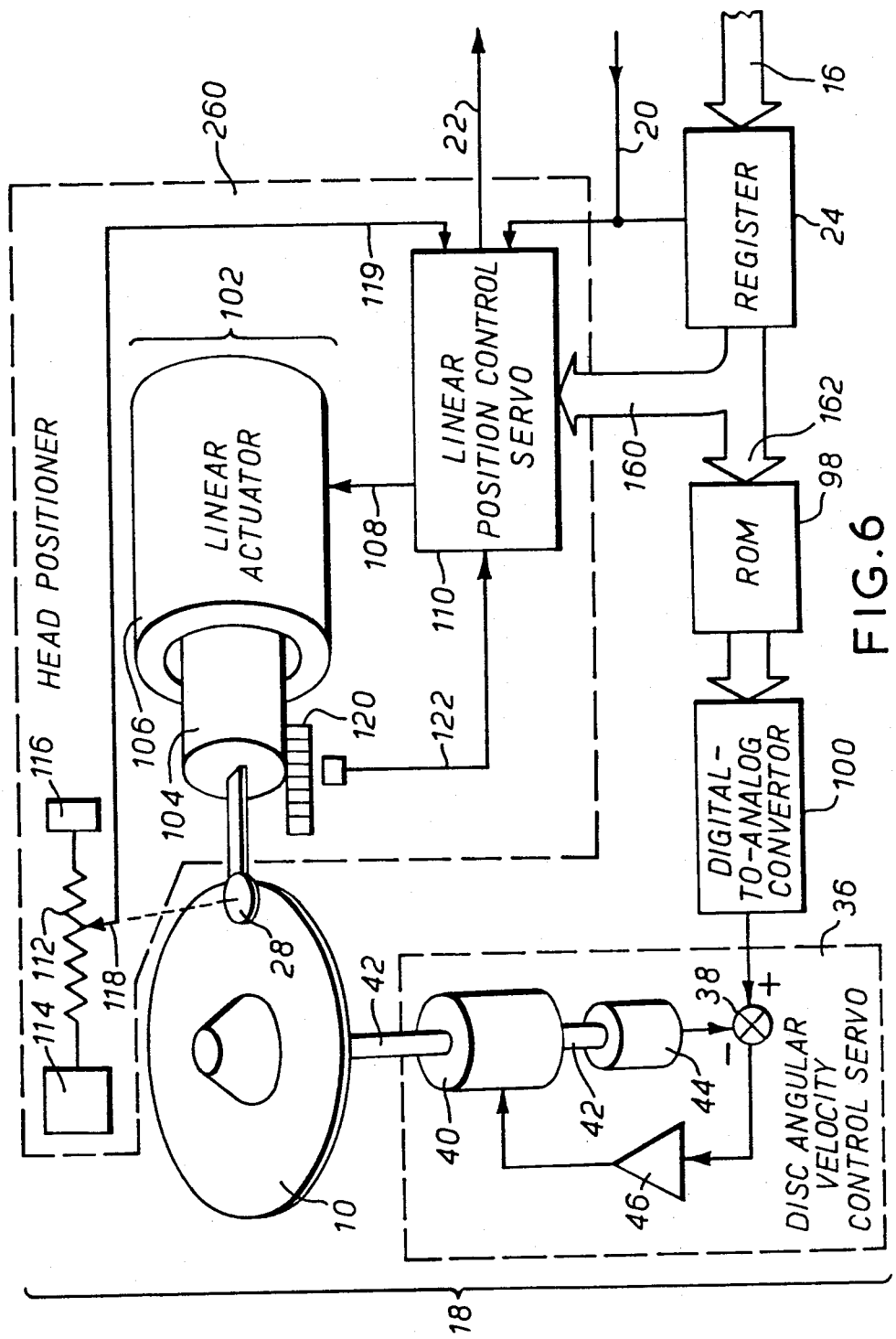
FIG. 6 shows the second preferred embodiment of the invention.

FIG. 6 shows a schematic drawing of the second preferred embodiment of the present invention. The second embodiment differs from the first embodiment firstly in the manner in which the angular velocity demand signal is supplied to the disc angular velocity control servomechanism and secondly in being illustrative of the use of a second type of head positioner 260 as part of the present invention.

Whereas the first preferred embodiment comprised a digital-to-analog convertor 30 providing output to a summing junction 32 for addition to output from a fixed reference source 34, the second preferred embodiment comprises a read only memory 98 hereafter called the ROM in receipt of the stored track address from the register 24 via the disc speed bus 162 for use as an address input. Each track address from the bus 162 causes the ROM 98 to provide a different parallel binary digit output. The output of the ROM 98 is a binary number whose magnitude is linearly proportional to the required angular velocity of the disc 10 for the track number present at its addressing input from the bus 162. The output binary number from the ROM 98 is coupled as the input to a second digital-to-analog convertor 100 operable to provide an analog output linearly proportional to the magnitude of the binary number present at its input. Thus the output of the second digital-to-analog convertor 100 is linearly proportional to the required angular velocity of the disc 10 for the number of the track 14 currently present at the input of the ROM 98. The output of the second digital-to-analog convertor 100 is coupled as the angular velocity demand signal to the angular velocity control servomechanism 36 which can be any of the kinds discussed in connection with the first preferred embodiment.

Turning attention to FIG. 4, it is to be appreciated that the binary numbers stored in the ROM 98 can in effect be used to plot any desired relationship between the disc angular velocity and the radius of the head 28 on the disc. However, it is preferred that the stored values cause the disc to rotate in a relationship given by the ideal hyperbolic curve 48. The actual surface velocity of the disc 10 beneath the head 28 can then be the same for every track and can further be controlled by the scaling of the output of the second digital-to-analog convertor 100.

While, in the second preferred embodiment all of the binary digits of the track address are shown being used via the bus 162 as an address input to the ROM 98, it is to be appreciated that a useful, stepwise approximation to the ideal curve 48 can be obtained by the omission of the lesser significant digits of the track address from inclusion in the ROM 98 address such that small bands of tracks 14 enjoy the same angular velocity.

In the head positioner 260 of the second preferred embodiment the head 28 is positioned by a voicecoil linear actuator 102 where the head 28 is coupled to a coil assembly 104 free to move in a direction radial to the disc 10 in a magnet assembly 106 in response to current supplied to the coil 104 via a power coupling 108 from a linear position control servomechanism 110. The linear position control servomechanism 110 is operable in a coarse mode in response to the signal on the track command bus 160 using a linear potentiometer 112 between first and second voltage sources 114 116 with its wiper 118 coupled to move with the head 28 to provide on the feedback coupling 119 a measure of the radius of the head 28 on the disc 10. Thereafter the linear position control servomechanism 110 is operable in a fine position mode in response to the feedback signal from an optical four-phase transducer 120 on the transducer coupling 122, to place the head 28 precisely over the desired track 14.

Figure 7:
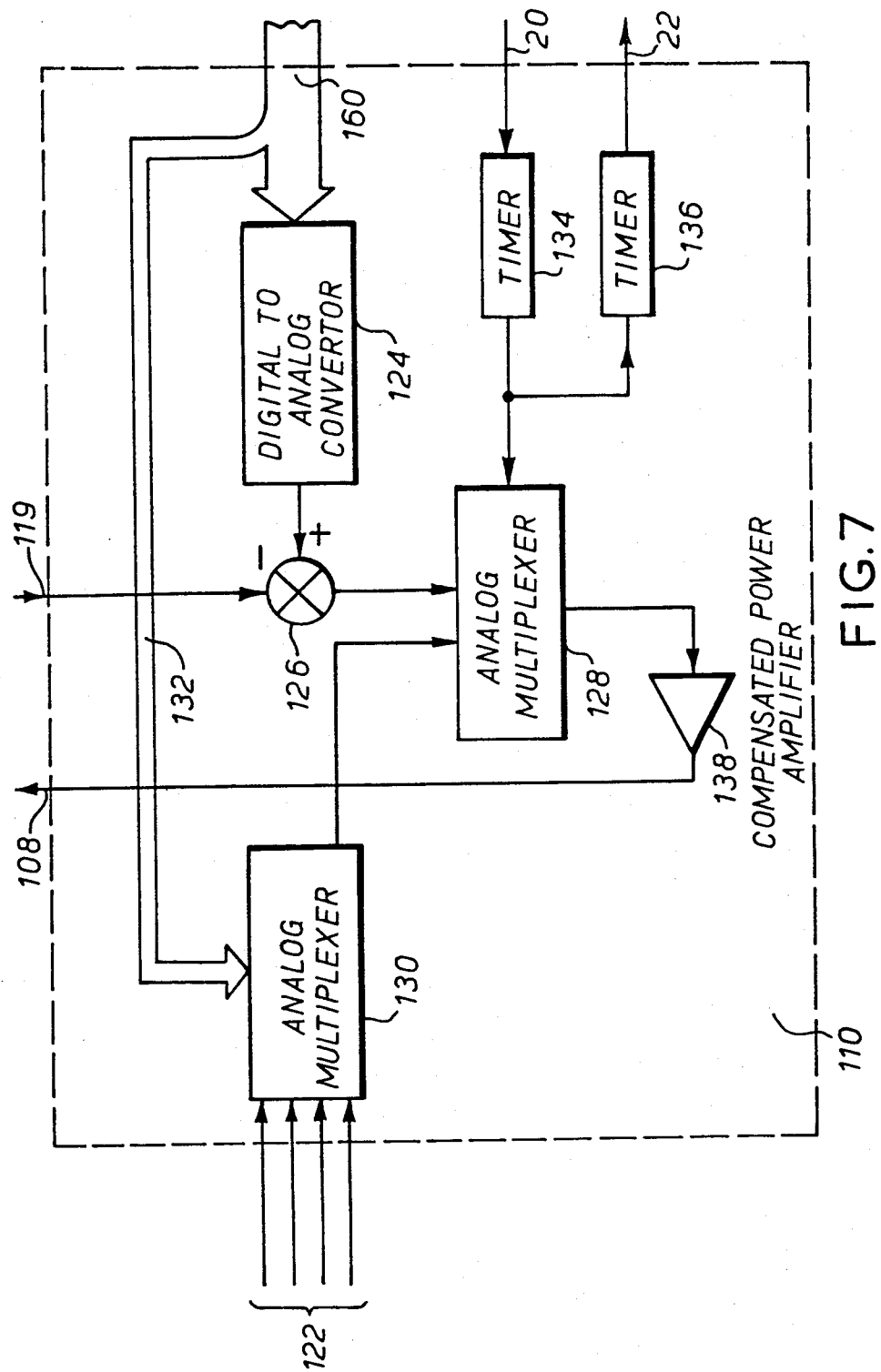
FIG. 7 shows schematic detail of the linear position control servo of FIG. 6.

FIG. 7 shows schematic detail of the linear position control servo 110.

The track address is coupled via the track command bus 160 as the input to a third digital-to-analog convertor 124 which provides an output linearly proportional to the magnitude of the track address. The output of the third digital-to-analog convertor 124 is coupled as the additive input to a position servo summing junction 126 and the voltage on the wiper 118 of the linear potentiometer 112 is coupled as the subtractive input to the position servo summing junction 126. The output of the position servo summing junction 126 is linearly representative of the difference between its inputs and is coupled as a first signal input to a mode-selecting analog multiplexer 128.

The four-phase signals from the optical transducer 120 are provided as the signal inputs to a phase-selecting analog multiplexer 130 in receipt of the two least significant binary digits of the track address as the controlling input on the control bus 132 and operable to respond to the logic signal thereon to select one unique one of the signals from the optical transducer 120 for each of four possible binary numbers represented by the two as the output, each of the four-phase signals providing a plurality of rest positions for the head 28 over the disc 10 and being selected such that, when the two least significant bits of the track address are 00 the phase signal selected by the multiplexer 130 provides rest positions with the head 28 over tracks, 0, 4, 8, 12, 16 and so on, when the two least significant bits of the track address are 01 the phase signal selected provides rest positions with the head 28 over tracks 1,5,9,13 and so on by increment of 4, when the two least significant bits of the track address are 10 the phase signal selected provides rest positions with the head over tracks 2,6,10, 14 and so on by increment of 4, and when the two least significant bits of the track address are 11 the phase signal selected provides rest positions with the head 28 over tracks 3,7,11,15 and so on by increment of 4.

The output of the phase-selecting analog multiplexer 130 is provided as the second signal input to the mode-selecting analog multiplexer 128.

The seek line 20 is coupled as the trigger input to a first one-shot timer 134. The first one-shot timer 134 provides output coupled as the controlling input to the mode-selecting analog multiplexer 128 and also provided as the trigger input to a second one-shot timer 136.

The output of the mode-selecting analog multiplexer 128 is selectably, in response to its control input, one or other of its two signal inputs, and is coupled as the input to a power amplifier 138 compensated in manners well known in control theory for the stability of the servo-mechanism.

When the SEEK indication is received on the seek line 20, the first one-shot timer 134 is triggered to perform a timeout operation. During the timeout operation the output of the first one-shot timer 134 causes the mode-selecting analog multiplexer 128 to provide as its output its first signal input, namely the signal from the position servo summing junction 126. The third digital-to-analog convertor 124 provides an output voltage proportional to the track number and the linear potentiometer 112 provides a feedback voltage which increases linearly with distance of the head 28 from the outermost track 14A. The output from the linear potentiometer 112 is so scaled that it provides zero output when the head 28 is over the outermost track 14A and provides an output equal to the output of the third digital-to-analog convertor 124 when the head 28 is over any selected track 14. Thus, while the first one-shot timer 134 is in the course of a timeout operation, the head positioner 260 is coupled in a coarse mode and the head 28 is moved approximately over the desired track 14 by the process of equalisation between the output of the third digital-to-analog convertor 124 and the output of the linear potentiometer 112.

The duration of the timeout operation of the first one-shot timer 134 is sufficiently long for the head 28 to reach its approximate position. The head 28 does not arrive exactly over its desired track 14 because of errors and non-linearity in the output of the linear potentiometer 112. However, it arrives within two track pitches of its destination.

When the first one-shot timer 134 finishes its timeout operation its change of output triggers the second one-shot timer 136. When the first one-shot timer 134 is not in the course of a timeout operation its output causes the mode-selecting analog multiplexer 128 to provide, as the input to the power amplifier 138, its second signal input, namely the output of the phase-selecting analog multiplexer 130. The head positioner 260 is thereby set into a fine position mode where the output of the transducer 120 controls the position of the head 28. The head 28 is therefore pulled into a position precisely over the chosen track 14. The "pulling in" process takes a short time, and the timeout period of the second one-shot timer 136 is set to be equal to or greater than this settling time. At the end of the timeout operation of the second one-shot timer 136 it provides output on the "seek complete" line 22 indicating that the head 28 has arrived so that reading or writing of data can be commenced.

The head positioner 260 of the second preferred embodiment is not restrictive with regard to the present invention, and represents only one of many variations which are well known in the art which can be used in the embodiment of the invention. The head positioner 260 as described is employed in the Burroughs B-9480 and B-9481 disc drives. The description of the head positioner 260 is provided merely in illustration and clarification of the manner in which a common track address can be used for the simultaneous command of a disc rotating mechanism and a head positioning mechanism.

The operation of the second preferred embodiment is the same as the operation of the first preferred embodiment having regard to the attainment of the target angular velocity of the disc prior to the arrival of the head 28 on the desired track 14, and differs therefrom only in that the angular velocity attained is governed according to the exact hyperbolic relationship illustrated by the curve 48 as opposed to the rectilinear approximation 62.

What I claim is:

1. A store for the storage of retrievable informational data in a plurality of concentric, circular storage tracks on a rotary medium, said store comprising:
    a positioner coupled to receive (a) track address information indicative of a selectable one, or a group, of said plurality of tracks and operable to respond thereto to move a data recording or recovering transducer toward adjacence with said selected track, or group of tracks, and
    an angular velocity controller coupled to receive said track address information and operable to respond thereto to select a related value of angular velocity for said medium associated with said track, or track group, and to (move) adjust said angular velocity toward said selected value,
    whereby said angular velocity controller is operable to (move) adjust said angular velocity toward said selected value (simultaneously with) contemporaneously with, but independently of, said movement of said transducer toward adjacence with said selected track and operable to arrive at said selected value contemporaneously with, if not in advance of, said transducer arriving at said selected track.

2. A store according to claim 1 wherein said angular velocity controller comprises a velocity selector coupled to receive said track address information and operable to select (said) a related angular velocity value to maintain the surface velocity of said medium relative to said transducer at said selected track substantially equal to a predetermined value whichever one, or group, of said plurality of tracks is said selected track.

3. A store according to claim 2 wherein said track address is a binary number.

4. A store according to claim 3 wherein adjacent ones of said plurality of tracks, or group thereof, are consecutively numbered by predetermined increment for each predetermined decrement of radius, whereby that one of said plurality of tracks having the greatest radius is allotted the least number and that one of said plurality of tracks having the least radius is allotted the greatest number, and wherein said selected track, or group thereof, is that track, or group, allotted the same number as said binary number.

5. A store according to claim 4 wherein said velocity selector comprises;
    a digital-to-analog convertor coupled to receive said binary number and operable to respond thereto to provide output linearly proportional to the magnitude thereof,
    a reference source for providing a predetermined reference level, and
    a summing junction coupled to receive said output of said digital-to-analog convertor and to receive said predetermined reference level and operable to provide output representative of the sum thereof, and
    wherein said angular velocity controller comprises a medium-rotating mechanism coupled to receive said output of said summing junction and operable to rotate said medium with an angular velocity linearly proportional thereto.

6. A store according to claim 5 wherein said least number is zero, wherein said output of said summing junction in response to said predetermined reference level causes said surface velocity of said medium relative to said transducer to equal said predetermined value when said transducer is adjacent to said track, or track group, of greatest radius, and wherein said output of said digital-to-analog convertor in response to said binary number is scaled such that said output of said summing junction in response to said output of said digital-to-analog convertor in receipt of said greatest number and of said predetermined reference level causes said surface velocity of said medium relative to said transducer to be equal to said predetermined value when said transducer is adjacent to said track, or track group, of least radius.

7. A store according to claim 6 wherein said medium-rotating mechanism comprises an angular velocity control feedback servomechanism in receipt of said output of said summing junction as an angular velocity demand signal.

8. A store according to one of claims 1 to 7 wherein said medium is a magnetic disc and wherein said transducer is a magnetic head.

9. A store according to claim 3 wherein said velocity selector comprises;
   a read-only-memory coupled to receive said binary number as an addressing input and operable in response thereto to provide as output a representation of a stored binary number having a magnitude linearly proportional to the required angular velocity of said medium with said transducer adjacent to said selected track, or group, and
   a digital-to-analog convertor coupled to receive said output of said read-only-memory as input and operable to respond thereto to provide output linearly proportional to the magnitude of said stored binary number, and
   wherein said angular velocity controller comprises a medium-rotating mechanism coupled to receive said output of said digital-to-analog convertor and operable to rotate said medium with an angular velocity linearly proportional thereto.

10. A store according to claim 9 wherein said medium-rotating mechanism comprises an angular velocity control feedback servomechanism in receipt of said output of said digital-to-analog convertor as an angular velocity demand signal.

11. A store according to claim 9 or claim 10 wherein said medium is a magnetic disc and wherein said transducer is a magnetic head.

12. A store according to claim 4 wherein said velocity selector comprises;
   a read-only-memory coupled to receive said binary number as an addressing input and operable in response thereto to provide as output a representation of a stored binary number having a magnitude linearly proportional to the required angular velocity of said medium with said transducer adjacent to said selected track, and
   a digital-to-analog convertor coupled to receive said output of said read-only-memory as input and operable to respond thereto to provide output linearly proportional to the magnitude of said stored binary number, and
   wherein said angular velocity controller comprises a medium-rotating mechanism coupled to receive said output of said digital-to-analog convertor and operable to rotate said medium with an angular velocity linearly proportional thereto.

13. A store according to claim 12 wherein said stored binary number is inversely proportional to said allotted number of said selected track.

14. A store according to claim 13 wherein said medium rotating mechanism comprises an angular velocity control feedback servomechanism in receipt of said output of said digital-to-analog convertor as an angular velocity demand signal.

15. A store according to claims 12, 13 or 14 wherein said medium is a magnetic disc and wherein said transducer is a magnetic head.

16. A data recording-storage-readback system for recording, storing and retrieving informational data in a plurality of storage tracks on a rotary medium, said system including one or more transducer means and comprising:
   head positioner means operatively associated with each said transducer means and constructed and arranged to receive track address information corresponding with the associated radial position on said rotary medium, and operable, responsive thereto, to move said associated transducer means toward this associated radial position; and
   rotational means constructed and arranged to rotate said medium at selectable rotational velocities and including velocity control means constructed and arranged to receive said track address information, or positional data representative thereof, whereby to adjust the angular velocity of said medium, in accordance with a change in the radial position of the transducer, whereby to shift toward a prescribed "target surface velocity" for the associated radial position, each selected track, or track group, having an associated "target surface velocity".

17. The system of claim 16 wherein said velocity control means is constructed and arranged to receive information reflecting a change in transducer position.

18. The combination as recited in claim 17 wherein said velocity control means is arranged to receive information reflecting an anticipated change in transducer position and is operative to so adjust angular velocity once the system has begun to seek that new track or group of tracks.

19. The combination as recited in claim 16 wherein said track information is received or converted into a signal indicating a "change in radial position" and the rotational means is constructed and arranged to begin so adjusting velocity once the associated transducer means begins to shift toward the associated address.

20. The combination as recited in claim 16 wherein said information received by said velocity control means comprises signals representing an anticipated change in head position.

21. The combination as recited in claim 16 wherein means are provided to sense the present radial position of the associated transducer means, to compare this position with an associated prescribed angular velocity for that radial position and, upon sensing any discrepancy therefrom, to begin adjusting angular velocity in the direction of the target velocity.

22. The combination as recited in claim 21 wherein the angular velocity associated with radial position of the transducer means is sensed from data recorded on the medium.

* * * * *